(12) United States Patent
Semadeni

(10) Patent No.: US 10,640,976 B2
(45) Date of Patent: May 5, 2020

(54) COMPONENT MADE OF HOLLOW GLASS BLOCKS

(71) Applicant: Marco Semadeni, Hirzel (CH)

(72) Inventor: Marco Semadeni, Hirzel (CH)

( * ) Notice: Subject to any disclaimer, the term of this patent is extended or adjusted under 35 U.S.C. 154(b) by 13 days.

(21) Appl. No.: 15/754,628

(22) PCT Filed: Aug. 31, 2016

(86) PCT No.: PCT/EP2016/001465
§ 371 (c)(1),
(2) Date: Feb. 23, 2018

(87) PCT Pub. No.: WO2017/036593
PCT Pub. Date: Mar. 9, 2017

(65) Prior Publication Data
US 2018/0283005 A1 Oct. 4, 2018

(30) Foreign Application Priority Data

Aug. 31, 2015 (CH) .................................. 01251/15

(51) Int. Cl.
*E04C 1/42* (2006.01)
*E04C 2/54* (2006.01)
*H01G 9/20* (2006.01)

(52) U.S. Cl.
CPC ................ *E04C 1/42* (2013.01); *E04C 2/546* (2013.01); *E04C 2/54* (2013.01); *E04C 2/543* (2013.01); *H01G 9/20* (2013.01)

(58) Field of Classification Search
CPC ............ E04C 2/546; E04C 2/54; E04C 2/543; H01G 9/20; H01G 9/2059
See application file for complete search history.

(56) References Cited

U.S. PATENT DOCUMENTS 2,194,731 A * 3/1940 Winship .................... E04C 1/42
52/308
2,333,723 A * 11/1943 Jordan ....................... E04C 1/42
52/306

(Continued)

FOREIGN PATENT DOCUMENTS

AT      200308 B    10/1958
CH      706018 A2   7/2013

(Continued)

OTHER PUBLICATIONS

Abstract of CH 706018 A2.

*Primary Examiner* — Phi D A
(74) *Attorney, Agent, or Firm* — Brian Roffe

(57) ABSTRACT

The invention relates to a component (1) for installing a room closing element made of hollow glass blocks (2, 3) using mortar or concrete and a suitable reinforcement. The component (1) according to the invention consists of two hollow glass blocks (2, 3), which are designed identically and preferably lie one next to the other, with an intermediate spacer (4) which seals the intermediate space between the glass blocks (2, 3) and is preferably assembled from multiple spacers (5, 5b, 5c) designed as hollow bodies that are separated from one another by intermediate films (6a, 6b) with coatings (7a, 7b). The component (1) is characterized by a comparatively large structural depth which ensures very good insulation values despite the small surface area of the glass blocks (2, 3). The structural depth also increases the geometrical moment of inertia with respect to bending, said moment of inertia allowing for large proportions of insulating mortar/concrete and components with large dimensions.

20 Claims, 1 Drawing Sheet

(56) References Cited

U.S. PATENT DOCUMENTS

| | | | | |
|---|---|---|---|---|
| 3,012,378 | A * | 12/1961 | Boyd | E04B 5/46 359/593 |
| 3,234,699 | A * | 2/1966 | Smith | E04C 1/42 428/167 |
| 3,935,681 | A * | 2/1976 | Voiturier | B32B 17/10045 52/1 |
| 4,233,796 | A * | 11/1980 | Mazzoni | E04C 2/54 52/172 |
| 4,628,652 | A | 12/1986 | Wefels | |
| 4,793,104 | A * | 12/1988 | Hultberg | E04B 2/10 52/127.3 |
| 5,006,967 | A * | 4/1991 | Diamond | E04C 1/42 362/147 |
| 5,010,704 | A * | 4/1991 | Thompson | E04B 2/08 52/308 |
| 5,033,245 | A * | 7/1991 | Kline | E04C 1/42 52/306 |
| 5,261,205 | A * | 11/1993 | Sandor | E04C 2/546 52/220.2 |
| 5,367,846 | A * | 11/1994 | vonRoenn, Jr. | E04C 1/42 52/308 |
| 5,430,985 | A * | 7/1995 | Coleman | E04C 1/42 52/308 |
| 5,448,864 | A * | 9/1995 | Rosamond | E04C 2/546 52/307 |
| 5,806,263 | A * | 9/1998 | Coleman | E04C 1/42 362/145 |
| 5,845,443 | A * | 12/1998 | Wirkus | E04C 1/42 52/308 |
| 5,860,260 | A * | 1/1999 | Hase | E04C 1/42 52/307 |
| 6,553,733 | B1 * | 4/2003 | Hock | E04C 1/42 52/308 |
| 7,373,763 | B2 * | 5/2008 | Voegele, Jr. | E04C 1/42 52/223.7 |
| 7,877,947 | B2 * | 2/2011 | Borressen | E04C 1/42 52/306 |
| 8,051,619 | B2 * | 11/2011 | Hohmann, Jr. | E04G 21/1883 52/677 |
| 2009/0007510 | A1 * | 1/2009 | McCoy | E04B 5/46 52/306 |

FOREIGN PATENT DOCUMENTS

| | | |
|---|---|---|
| DE | 2263127 A1 | 7/1974 |
| DE | 29721211 U1 | 1/1998 |
| EP | 0103192 A2 | 3/1984 |
| EP | 0853167 B1 | 7/1998 |
| EP | 1447941 A1 | 8/2004 |
| EP | 1447941 B1 | 4/2016 |
| GB | 1436399 A | 5/1976 |
| WO | 2017036593 A1 | 3/2017 |

* cited by examiner

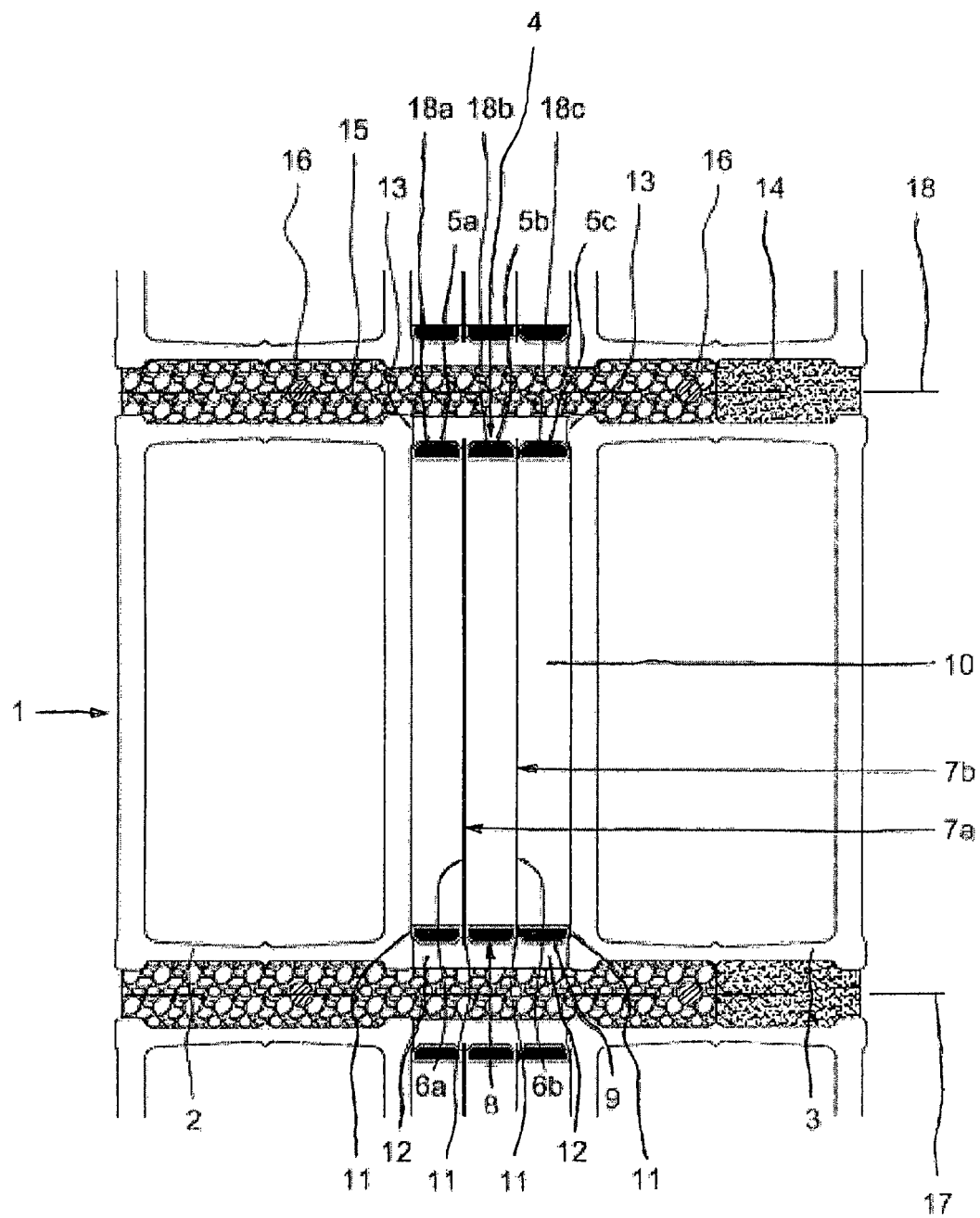

COMPONENT MADE OF HOLLOW GLASS BLOCKS

FIELD OF THE INVENTION

The invention relates to a component for constructions made of hollow glass blocks using mortar or concrete and optionally a suitable reinforcement.

BACKGROUND OF THE INVENTION

Components of this type serve as glazing elements for horizontal, inclined or vertical glass installations as room closing elements in roof and ceiling openings or facades. A disadvantage of the previously known components of this type is that they have poor physical construction properties as well as poor U and G values. In addition, they result in a construction with many potential weak points such as, for example, the adhesion or weld points in heat-insulated glass block connections, as well as rubber seals, joints, overlaps and weatherboard panels which are critical for the penetration of water.

Further disadvantages are poorly insulating concrete and mortar, as well as the glass blocks themselves which, as hollow bodies, conduct heat via their glass walls and allow radiant heat to pass directly through them due to the untreated pressed glass property of the glass blocks.

Due to the small unit of area and the heterogeneous static bond with the concrete/mortar and the reinforcement it is therefore difficult to produce components of the type specified at the start which have good heat and sun protection insulation and at the same time withstand the static transfer of force over long periods of time without any damage. Damage generally occurs due to the glass blocks, as pressed glass hollow bodies, becoming permeable and taking in condensate, as a result of which their visual and physical construction properties are lost.

Unlike insulating glass made of plate glass, the surface areas of glass blocks made of pressed glass are a multiple smaller, and so only the interaction of the whole heterogeneous system over a very large structural depth can lead to good physical construction values.

Attempts to produce better insulating glass blocks with direct adhesion of glass block onto glass block, possibly with a pane of glass adhered in place, have failed because the static loading of a component produced from such glass blocks allows the adhesion to become permeable, and the heat-insulating properties are extremely minimal. Moreover, with this it is necessary to seal off the various passages that occur from water and also to keep them sealed over long periods of time.

OBJECTS AND SUMMARY OF THE INVENTION

The object underlying the invention is to avoid these disadvantages and to devise a component of the type specified at the start which has a simple construction and so guarantees permanent reliable sealing with high-grade physical construction properties.

According to the invention this object is achieved in that the component consists of two hollow glass blocks which are preferably designed identically, with an intermediate spacer system which seals the intermediate space.

The component according to the invention thus acquires a relatively large structural depth which ensures very good insulation values despite the small surface area of the glass blocks. The large structural depth of the component also results in an increase in its geometrical moment of inertia with respect to bending, which in turn allows for large proportions of insulating mortar/concrete and components with large dimensions.

The spacer system between the hollow glass blocks preferably consists of a number of individual spacers which are separated from one another by intermediate films with coatings. The films with coatings may also be panes of glass. However, in comparison to glass, the advantage of films is substantially less conduction of heat from the middle of the cavity into the peripheral bond of the spacer system. The coatings of the films serve here as protection against heat and/or the sun.

According to the invention, the individual spacers are made in the form of frame-shaped hollow profiles which are provided on the rear with a coating provided to the outside and which is gas- and water vapor-tight. These hollow profiles are filled with a moisture-absorbent material. In order to seal the cavity between the glass blocks, a primary seal made of butyl or similar materials is provided between the individual spacers and between them and the glass blocks. A secondary seal made of silicone or a similar material is attached to the outside on the individual spacers as well as between the glass block edges, and this secondary seal seals the spacer system and protects it against static/mechanical effects which may occur in the whole component.

In order to reduce the conduction of heat, the cavity formed by the spacer system can additionally be filled with inert gas. It may also be advantageous if a vacuum is generated in the cavity of the glass blocks.

Furthermore, the invention makes provision such that mortar or concrete is preferably used to the outside of the room closing element, whereas insulating mortar or insulating concrete made of closed-pore foamed glass beads is applied towards the inside of the room closing element. In this way the conduction of heat from the outside to the interior can be prevented.

It is advantageous here to provide a reinforcement lying in the plane parallel to the surface of the component as well as to the plane of the room closing element within the mortar/concrete and/or within the insulating mortar/concrete. Anchoring sleeves or similar fastening elements can be attached to the reinforcement. However, it is also possible to fasten the reinforcement directly to the building. The mortar/concrete system with reinforcement stabilizes the spacer system with respect to internal pressure.

The structure of the component described above is designed such that the latter can also be involved in static influences such as the application of force or movements without the spacer system being damaged or becoming permeable. The spacer system according to the invention is stable such that it contributes to the statics of the entire component and supports the stabilisation of the heterogeneous bond.

BRIEF DESCRIPTION OF THE DRAWING

The invention will be described in more detail using an exemplary embodiment with reference to the drawing. This shows:

FIG. 1 is a cross-section through a component according to the invention.

DETAILED DESCRIPTION OF THE INVENTION

The components 1 shown in FIG. 1 each have two identically designed hollow glass blocks 2, 3 which are used in a known manner as walling on external facades or external walls or also internal walls of buildings of all types. Likewise, these hollow glass blocks are suitable for the floors or roofs of buildings in order to allow light to pass through them. The element edges advantageously form axes of symmetry 17, 18 of the components 1 relative to one another.

According to the invention this component 1 consists of preferably two identically designed hollow glass blocks 2, 3 with an intermediate spacer system 4 which seals the intermediate space and at the same time causes the structural depth of the component 1 to be increased.

The spacer system 4 is made up of three individual spacers 5a, 5b, 5c designed as hollow profiles which are separated from one another by intermediate plastic films 6a, 6b with coatings 7a, 7b serving as heat and/or sun protection. The spacers 5a, 5b, 5c are provided on the rear 8 with a coating 9 provided to the outside and which is gas- and water vapor-tight.

In order to seal the cavity 10 between the glass blocks 2, 3 there is a primary seal 11 made of butyl or a similar material between the individual spacers 5a, 5b, 5c and between them and the glass blocks 2, 3. A secondary seal 12 made of silicone or a similar material is attached to the outside on the individual spacers 5a, 5b, 5c as well as between the edges 13 of the glass blocks, and this seals the spacer system 4 and effectively protects it against static/mechanical effects. In order to effectively remove humidity from the cavity 10, the internal spaces 18a, 18b, 18c can be filled with a dehumidifying means.

In order to reduce the conduction of heat, the cavity 10 formed by the spacers 5a, 5b, 5c can additionally be filled with inert gas, such as for example krypton.

The component 1 is closed off at the top and at the bottom with a mortar/concrete layer, mortar or concrete 14 being used towards the outside of the room closing element, whereas insulating mortar or insulating concrete 15 made of closed-pore foamed glass beads is applied towards the inside of the room closing element. In this way the mortar/concrete layer 14, 15 is prevented from being able to conduct heat from the outside into the interior of the building or vice versa.

Disposed in this layer is a reinforcement 16 lying in the plane parallel to the surface of the component 1 as well as to the plane of the room closing element. Anchoring sleeves or similar fastening elements can be attached to the reinforcement 16. The reinforcement can also be anchored directly in the connecting component.

In the exemplary embodiment that is described the spacer system 4 consists of three individual spacers 5a to 5c. However, within the framework of the invention it is also perfectly possible to provide a spacer system with less or with more than three individual spacers depending on the dimensions and/or the conditions for use of the block. These individual spacers may also be provided with different thicknesses.

In the exemplary embodiment that is described the two hollow glass blocks 2, 3 are designed identically. However, the invention can also be realized with components of which the glass blocks have different dimensions, in particular with regard to their structural depth.

For better insulation of the component, a vacuum can be generated in the cavity of the glass blocks 2 and/or 3. Within the framework of the invention, known materials different from those mentioned above can be used as the mortar or concrete 14 or as the insulating mortar or the insulating concrete 15 which may be different than the mortar or concrete 14.

The invention claimed is:

1. A component for constructions made of hollow glass blocks to separate a first area from a second area, comprising:

first and second hollow glass blocks arranged one next to the other to define an intermediate space therebetween, the first hollow glass block being on a side of the component closer to the first area and the second hollow glass block being on a side of the component closer to the second area such that the first hollow glass block is between the intermediate space and the first area and the second hollow glass block is between the intermediate space and the second area; and an intermediate spacer system which seals the intermediate space between the first and second hollow glass blocks, the intermediate spacer system comprising a first individual spacer arranged between the first and second hollow glass blocks and which includes a frame-shaped profile having a first surface facing the first hollow glass block and the first area, a second surface facing the second hollow glass block and the second area, and an inner surface defining a hollow interior, the frame-shaped profile being positioned relative to the first and second hollow glass blocks such that the hollow interior of the frame-shaped profile is between hollow spaces in the first and second hollow glass blocks.

2. The component according to claim 1, wherein the intermediate spacer system further comprises a second individual spacer alongside the first spacer and which includes a frame-shaped profile having a first surface facing the first hollow glass block and the first area, a second surface facing the second hollow glass block and the second area, and an inner surface defining a hollow interior, the frame-shaped profile of the second spacer being positioned relative to the first and second hollow glass blocks such that the hollow interior of the frame-shaped profile of the second spacer is between the hollow spaces in the first and second hollow glass blocks, the second spacer being separated from the first spacer by an intermediate film having a coating that extends between the first and second spacers to separate the hollow interior of the frame-shaped profile of the first spacer from the hollow interior of the frame-shaped profile of the second spacer.

3. The component according to claim 2, wherein the intermediate spacer system further comprises a third individual spacer alongside the second spacer and which includes a frame-shaped profile having a first surface facing the first hollow glass block and the first area, a second surface facing the second hollow glass block and the second area, and an inner surface defining a hollow interior, the frame-shaped profile of the third spacer being positioned relative to the first and second hollow glass blocks such that the hollow interior of the frame-shaped profile of the third spacer is between the hollow spaces in the first and second hollow glass blocks, the third spacer being separated from the second spacer by an intermediate film having a coating that extends between the second and third spacers to separate the hollow interior of the frame-shaped profile of the second spacer from the hollow interior of the frame-shaped profile of the third spacer.

4. The component according to claim 1, wherein the intermediate spacer system further comprises:

a first additional individual spacer alongside the first spacer and which includes a frame-shaped profile having a first surface facing the first hollow glass block and the first area, a second surface facing the second hollow glass block and the second area, and an inner surface defining a hollow interior, the frame-shaped profile of the first additional spacer being positioned relative to the first and second hollow glass blocks such that the hollow interior of the frame-shaped profile of the first additional spacer is between the hollow spaces in the first and second hollow glass blocks, the first additional spacer being separated from the first spacer by an intermediate film having a coating that extends between the first spacer and the first additional spacer to separate the hollow interior of the frame-shaped profile of the first spacer from the hollow interior of the frame-shaped profile of the first additional spacer; and a second additional individual spacer alongside the first additional spacer and which includes a frame-shaped profile having a first surface facing the first hollow glass block and the first area, a second surface facing the second hollow glass block and the second area, and an inner surface defining a hollow interior, the frame-shaped profile of the second additional spacer being positioned relative to the first and second hollow glass blocks such that the hollow interior of the frame-shaped profile of the second additional spacer is between the hollow spaces in the first and second hollow glass blocks, the second additional spacer being separated from the first additional spacer by an intermediate film having a coating that extends between the first additional spacer and the second additional spacer to separate the hollow interior of the frame-shaped profile of the first additional spacer from the hollow interior of the frame-shaped profile of the second additional spacer, whereby the first spacer and the first and second additional spacers are all alongside one another.

5. The component according to claim 1, wherein the intermediate spacer system further comprises a second individual spacer alongside the first spacer and which includes a frame-shaped profile having a first surface facing the first hollow glass block and the first area, a second surface facing the second hollow glass block and the second area, and an inner surface defining a hollow interior, the frame-shaped profile of the second spacer being positioned relative to the first and second hollow glass blocks such that the hollow interior of the frame-shaped profile of the second spacer is between the hollow spaces in the first and second hollow glass blocks, the spacer system further comprising a pane of glass that extends between the first and second spacers to separate the hollow interior of the frame-shaped profile of the first spacer from the hollow interior of the frame-shaped profile of the second spacer.

6. The component according to claim 5, wherein the intermediate spacer system further comprises a third individual spacer alongside the second spacer and which includes a frame-shaped profile having a first surface facing the first hollow glass block and the first area, a second surface facing the second hollow glass block and the second area, and an inner surface defining a hollow interior, the frame-shaped profile of the third spacer being positioned relative to the first and second hollow glass blocks such that the hollow interior of the frame-shaped profile of the third spacer is between the hollow spaces in the first and second hollow glass blocks, the spacer system further comprising a pane of glass that extends between the second and third spacers to separate the hollow interior of the frame-shaped profile of the second spacer from the hollow interior of the frame-shaped profile of the third spacer.

7. The component according to claim 2, wherein the spacer system further includes gas-vapor and water vapor-tight coatings provided to the outside on the rear.

8. The component according to claim 2, further comprising:
a first primary seal between the first and second spacers,
a second primary seal between the first surface of the first spacer and the first hollow glass block, and
a third primary seal between the second surface of the first spacer and second hollow glass block.

9. The component according to claim 8, wherein at least one of the first, second and third primary seals is made of butyl.

10. The component according to claim 2, further comprising a secondary seal on an outside on the first spacer.

11. The component according to claim 10, wherein the secondary seal is made of silicone.

12. The component according to claim 1, wherein the intermediate space is filled with inert gas or a vacuum is generated therein.

13. The component according to claim 1, wherein the component is part of a room closing element such that the first area is an exterior area outside of the room and the second area is an interior area inside of the room, further comprising:
mortar or concrete alongside edges of the component toward the first area; and
insulating mortar or insulating concrete made of closed-pore foamed glass beads alongside edges of the component toward the second area and which is different than the mortar or concrete alongside edges of the component toward the first area.

14. The component according to claim 13, further comprising a reinforcement lying in a plane parallel to a surface of the component as well as to a plane of the room closing element within at least one of the mortar or concrete alongside edges of the component toward the first area and the insulating mortar or insulating concrete alongside edges of the component toward the second area.

15. The component according to claim 14, further comprising anchoring sleeves fastened to the reinforcement.

16. The component according to claim 14, wherein the reinforcement is configured to be fastened directly to a building.

17. The component according to claim 1, wherein the first and second hollow glass blocks are identical to one another.

18. A component for constructions made of hollow glass blocks to separate a first area from a second area, comprising:
first and second hollow glass blocks arranged one next to the other to define an intermediate space between a rear surface of the first hollow glass block and a front surface of the second hollow glass block, the first hollow glass block being on a side of the component closer to the first area and the second hollow glass block being on a side of the component closer to the second area such that the first hollow glass block is entirely between the intermediate space and the first area and the second hollow glass block is entirely between the intermediate space and the second area; and an intermediate spacer system which seals the intermediate space between the rear surface of the first hollow glass block and the front surface of the second hollow glass blocks, the intermediate spacer system comprising:
- a plurality of individual spacers arranged between the first and second hollow glass blocks and each of which includes a frame-shaped profile having a first surface facing the first hollow glass block and the first area, a second surface facing the second hollow glass block and the second area, and an inner surface defining a hollow interior, the frame-shaped profile of each of the spacers being positioned relative to the first and second hollow glass blocks such that the hollow interior of the frame-shaped profile of each of the spacers is between hollow spaces in the first and second hollow glass blocks; and
- a substrate between each adjacent pair of the spacers to separate the hollow spaces of the frame-shaped profiles of the adjacent pair of spacers, the substrate being an intermediate film having a coating, or a pane of glass.

19. The component according to claim 18, wherein the component is part of a room closing element such that the first area is an exterior area outside of the room and the second area is an interior area inside of the room, each of the first and second hollow glass blocks having a front surface facing the first area and a rear surface facing the second area.

20. The component according to claim 19, wherein the first and second hollow glass blocks further include lateral surfaces extending between the front and rear surfaces, further comprising:
- mortar or concrete alongside at least a portion of the lateral surfaces toward the first area and alongside the intermediate spacer system between the first and second hollow glass blocks; and
- insulating mortar or insulating concrete alongside at least a portion of the lateral surfaces toward the second area and which is different than the mortar or concrete alongside at least a portion of the lateral surfaces toward the first area and alongside the intermediate spacer system between the first and second hollow glass blocks.

\* \* \* \* \*